United States Patent [19]

Gleasman

[11] Patent Number: 4,873,754

[45] Date of Patent: Oct. 17, 1989

[54] TOOL FOR REMOVING SNAP RINGS

[76] Inventor: Vernon E. Gleasman, 11 Pondview Dr., Pittsford, N.Y. 14534

[21] Appl. No.: 231,380

[22] Filed: Aug. 12, 1988

[51] Int. Cl.⁴ .............. B23P 19/04

[52] U.S. Cl. .............. 29/229

[58] Field of Search .............. 29/229, 268; 269/254 R

[56] References Cited

U.S. PATENT DOCUMENTS

| | | | |
|---|---|---|---|
| 2,483,379 | 9/1949 | Brell | 29/229 |
| 2,597,381 | 5/1952 | Roper | 29/229 |
| 3,112,560 | 12/1963 | Wagoner | 29/229 |
| 3,173,197 | 3/1965 | Tuller | 29/229 |
| 4,375,284 | 3/1983 | Doiron | 269/254 R |

*Primary Examiner*—Robert C. Watson
*Attorney, Agent, or Firm*—Howard J. Greenwald

[57] ABSTRACT

An articulated, self-aligning tool for removing radial retaining rings from grooved surfaces is disclosed. Said tool comprises two resilient, integral prongs adapted to be moved from each other by the application of force wherein said prongs are substantially separated from each other by an orifice and a slit appearing therebetween and wherein said slit communicates said orifice. The tool is also comprised of means for maintaining said prongs in parallel, in-line relation to each other.

6 Claims, 2 Drawing Sheets

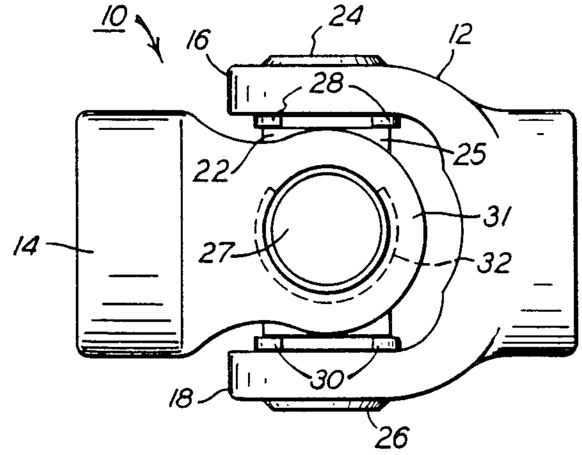
FIG. 1
FIG. 2
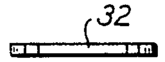
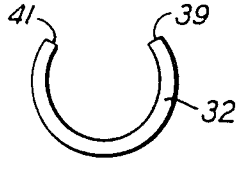
FIG. 3
FIG. 4
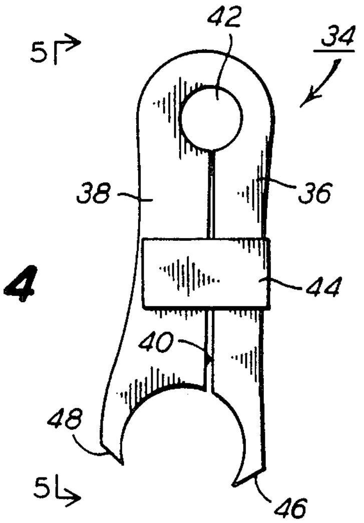
FIG. 5
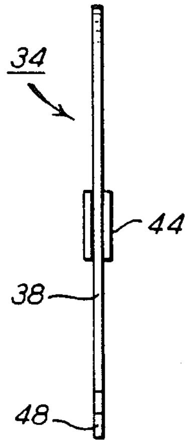

TOOL FOR REMOVING SNAP RINGS

FIELD OF THE INVENTION

A tool for removing retaining rings from grooved surfaces is disclosed.

BACKGROUND OF THE INVENTION

Retaining rings, which are often also referred to as "snap rings", are precision-engineered fasteners designed to provide an accurately located shoulder for positioning and securing components on shafts and in bores and housings. These retaining rings are extensively described in the prior art. Thus, for example, they are described on pages 11-1 to 11-45 of a book by Robert O. Parmley entitled "Mechanical Components Handbook" (McGraw-Hill Book Company, New York, 1985), the disclosure of which is hereby incorporated by reference into this specification.

Many axial and radial retaining rings are designed to be assembled in a groove on a shaft or inside a bore or housing. One important class of axial and radial retaining rings are the wire-formed retaining rings, which are split rings formed and cut from wire of uniform cross-sectional size and shape; the wire is usually cold-dranw or rolled into shape from a continuous coil or bar, and then the gap ends are cut into various configurations for ease of application and removal. This class of retaining rings may be removed from grooved surfaces by the tool of this invention.

Flat retaining rings may also readily be removed from grooved surfaces by the tool of this invention. As those skilled in the art are aware, crescent-shaped rings, E-rings, and high-strength radially assembled rings are some of the types of flat retaining rings. The crescent-shaped rings have tapered sections; they are described, e.g., on pages 11-10 to 11-11 of said Parmlee book. The E-rings fucntion as large shoulders on small-diameter shafts; they are described, e.g., on page 11-11 of the Parmlee book. The high-strength radially assembled rings are relatively thick and have tapered-strength bending arms; they are described on pages 11-11 and 11-16 of the Parmlee book.

Applicant is not aware of any means provided by the prior art for readily and efficiently removing flat and/or radial wire-formed retaining rings from externally-grooved surfaces, such as, e.g., the surface of a shaft. It is applicant's belief that the method currently most widely used in the industry is to place screwdriver blades at each end of the retaining rings, apply forces at each of such ends in opposite directions, and balance such forces in a manenr such that the retaining ring is displaced from the groove. If the forces are not adequately balanced, the retaining ring may ride around the perimeter of the shaft in the groove.

It is an object of this invention to provide an apparatus for readily removing retaining rings from grooved surfaces.

SUMMARY OF THE INVENTION

In accordance with this invention, there is provided on articulated, self-aligning tool for removing radial retaining rings from grooved surfaces, said tool comprising: (a)two resilient, integral prongs adapted to be moved from each other by the application of force, said prongs being substantially separated from each other by an orifice and a slit appearing therebetween, said slit communicating with said orifice; and (b)means for maintaining said prongs in parallel, in-line relation to each other.

DESCRIPTION OF THE DRAWINGS

The present invention will be more fully understood by reference to the following detailed description thereof, when read in conjunction with the attached drawings, wherein like reference numerals refer to like elements and wherein:

FIG. 1 is a partial sectional view of a Hooke universal joint on which a multiplicity of snap rings appear;

FIG. 2 is a side view of one of such snap rings;

FIG. 3 is a top view of one of such snap rings;

FIG. 4 is a front view of one of the preferred tools of this invention;

FIG. 5 is a side view of the tool of FIG. 4;

DESCRIPTION OF THE PREFERRED EMBODIMENTS

Figure 6:
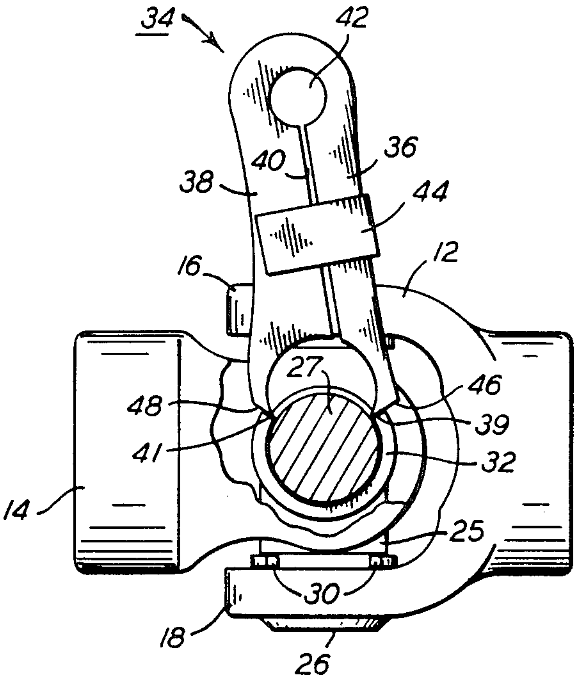
FIG. 6 illustrates the tool of FIG. 4 in contact wioth one of the snap rings of the universal joint of FIG. 1 prior to the time force has been applied to the tool.

In one of the preferred embodiments ofis invention, an apparatus is provided which is especially suited for removing radial retaining rings from universal joints. Universal joints utilizing snap rings to facilitate assembly and disassembly are commonly used in the automotive industry, and they are readily available.

Thus, universal joints utilizing snap rings are sold under the "Spicer" name by the Drivetrain Service Division of Dana Corporation, P.O. Box 321, Toledo, Ohio 43691; see, e.g., the Spicer catalog identified as "Weatherly Index 090, K350-DSD, July, 1986," the disclosure of which is hereby incorporated by reference into this specification. On pages 7 to 147 of this catalog, there are listed a "Type 1" universal joint (inside snap ring), a "Type 2" universal joint (outside snap ring), and a "Type 3" universal joint (2 inside and 2 outside snap rings). Other universal joints with snap rings are also listed in this catalog.

Thus, e.g., universal joints with snap rings are listed in the Buyers Products Company's 1986 catalog (available from Buyers Products Company, 7700 Tyler Blvd., Mentor, Ohio 44060); see, e.g., pages 6, 7, 10, and 12 of said catalog, the disclosure of which is hereby incorporated by reference into this specification.

The remainder of this specification will be devoted to describing such universal joints and how snap rings may be removed therefrom, it being understood that the apparatus of this invention may be used with other structures which contain a snap ring it is desired to remove.

As is known to those skilled in the art, a universal joint is a linkage that transmits rotation between two shafts whose axes are coplanar but not coinciding. One of the most common universal joints, illustrated in FIG. 1, is Hooke's joint. Universal joint 10 consists of U-shaped yoke 12 and U-shaped yoke 14, each of which may be connected to their respective shafts.

Each of yokes 12 and 14 has two arms; thus, as is illustrated in FIG. 1, yoke 12 has arms 16 and 18. The arms of yoke 14, not shown, are substantially perpendicular to the arms of yoke 12. The arms of yokes 12 and 14 are connected to each other by spider 22, partially shown in FIG. 1. In one embodiment, spider 22 is an integral, cross-shaped device with two mutually perpendicular arms.

As is illustrated in FIG. 1, each of the arms of yoke 12 has an orifice in it through which one of the ends of the arms of spider 22 can extend. End 24 of one arm 25 of spider 22 extends through an orifice in arm 16 of yoke 12, and the other end 26 of said arm 25 extends through an orifice in arm 18 of yoke 12. End 27 of the other arm of spider 22 extends through an orifice in arm 31 of yoke 14, and the other end of the arm of spider 22 (not shown) extends through an orifice (not shown) in the other arm (not shown) of yoke 14.

The arms of spider 22 are secured to U-shaped yokes 12 and 14 by snap rings. Thus, referring to FIG. 1, snap rings 28 and 30 have been mounted on grooves on arm 25 of spider 22, and snap ring 32 has been mounted on the other arm (not shown) of spider 22. In FIG. 2, a side view of snap ring 32 is shown. In FIG. 3, a top view of snap ring 32 is presented.

The tool of this invention which may be used to remove snap rings 28, 30, and 32 from universal joint 10 is illustrated in FIG. 4, and a side view of this tool is shown in FIG. 5. As is shown in these figures, this tool is articulated. As used in this specification, the term articulated refers to a tool which has at least two distinct segments which cooperate to produce the intended result. Thus, tool 34 is comprised of prong 36 and prong 38. The articulation of prongs 36 and 38 is controlled by the snap ring groove adjacent to the inner ends 39 and 41 (see FIG. 3) of the snap ring; prongs 36 and 38 tend to ride in this groove as force is applied on tool 34 to remove the snap ring. This articulation is also dependent upon the spaces between the prongs. Prongs 36 and 38 are substantially separated from each other by slot 40 and orifice 42 which appears therebetween, said slit and said orifice communicating with each other.

In the preferred embodiment illustrated in the Figures, prongs 36 and 38 are part of an integral structure comprised of prong 36, slot 40, orifice 42, and prong 38; thus, prongs 36 and 38 and 38 are hereinafter referred to in this specification as "integral prongs." because they are joined to each other at one of their ends by section 43 of tool 34 to form a one-piece unit. As those skilled in the art will realize, the amount of force necessary to move prong 38 away from prong 36 will depend upon the width of tool 34, the type of material the tool is made from, the dimensions of orifice 42, the shape of orifice 42, and the dimensions of prongs 36 and 38. Thus, e.g., although orifice 42 is shown with a circular cross-section in the Figures, other cross-sections may be used for such orifice.

Tool 34 is self-aligning. The term self-aligning, as used in this specification, refers to an articulated tool with at least two prongs which, when force is applied to move said prongs away from each other, has means to insure that the prongs remain both parallel to each other and in line. Thus, in the preferred embodiment illustrated in the Figures, guide 44 provides means to insure that prongs 36 and 38, as they separate from each other under the application of force, remain both parallel and in line.

Any means for maintaining prongs 36 and 38 in parallel, inline relation to each other known to those skilled in the art can be used as guide 44.

Prongs 36 and 38 are resilient. As used in this the term resilient, when applied to said prongs, means that they have elasticity, that after they are moved away from each other by the application of force and such force is removed, they resume their original shape.

Means for preparing tools with resilient prongs are well known to those skilled in the art. One such means, which is preferred by applicant, is to make the tool with spring tempered alloy, such as steel. As is known to those skilled in the art, tempering is the reheating of previously quenched alloy to a predetermined temperature below the critical range, holding the alloy for a specified time at that temperateure, and then cooling it at a controlled rate, usually by immediate rapid quenching, to room temperature. It is described in, e.g., H. E. McGennon's (ed.), "The Making and Shaping and Treating of Steel," 8th edition, 1964; and B. Stoughton, A. Butts, and A. M. Bounds "Engineering Metallurgy," 4th edition, 1953. The disclosure of these McGennon and Stoughton et al. books is hereby incorporated by reference into this specification.

Spring-tempered steel is the preferred tempered alloy. Some suitable spring-tempered steels are described on pages 23-38 to 23-55 of R. H. Perry and C. H. Chilton's "Chemical Engineers' Handbook," Fifth Edition (McGraw-Hill Book Company, New York, 1973), the disclosure of which is hereby incorporated by reference into this specification.

Other spring-tempered materials also can be used. Thus, for example, in the bronze family of materials, for example, one can use the "Herculary" spring-tempered material available from the which consists essentially of bronze. Additionally, or alternatively, the snap ring(s) may consist essentially of spring-tempered steel and/or spring-tempered bronze. Thus, in one preferred embodiment, both the tool 34 and the snap rings it removes consist essentially of spring-tempered bronze.

Other materials which have the desired resiliency when fashioned into the shape of the tool of this invention also may be used. Thus, as those skilled in the art are aware, certain plastic materials provide the desired resiliency.

In the preferred embodiment illustrated in the Figures, substantially U-shaped tool 34 defines prongs 36 and 38. In this preferred embodiment, ends 46 and 48 of prongs 36 and 38 are designed to mesh with and be complementary to ends 39 and 41, respectively, of the snap ring so that, when force is applied to the tool 34, the snap ring is pushed out of the groove in which it is present.

Because ends 46 and 48 of prongs 36 and 38 are to be inserted into the groove in which the snap ring is present, tool 34 should preferably be of the same width or narrower than the width of the snap ring groove.

Figure 7:
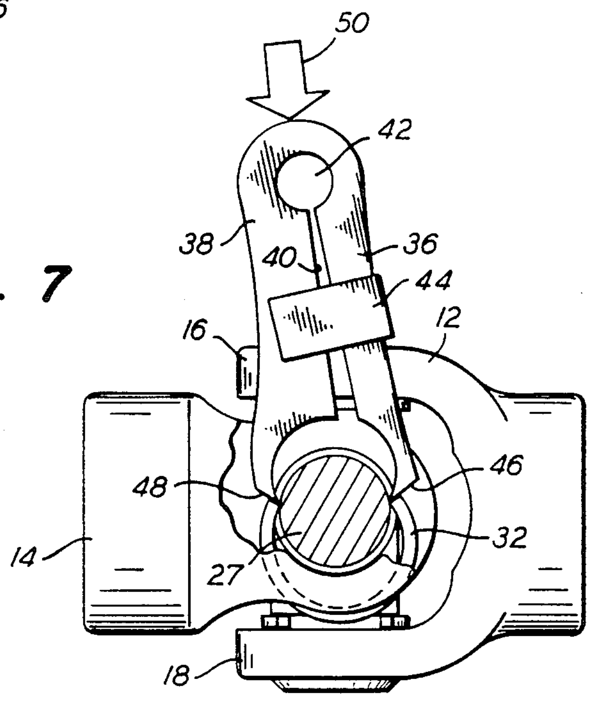
FIG. 7 illustrates the tool of FIG. 4 in contact with one of the snap rings of the universal joint of FIG. 1 after the time force has been applied to the tool.

Prongs 36 and 38 are adapted to be moved away from each other by the application of force. These prongs are preferably so configured that, as force is applied to tool 34 in, e.g., the direction of arrow 50 (see FIG. 7), prongs 36 and 38 separate, and the shape defined by the separated prongs is preferably substantially identical to the a portion of the shape of the shaft on which the snap ring is present. Thus, as is illustrated in FIG. 5, the shaft from which the snap ring is being displaced in substantially circular in shape, and the interior portions of prongs 36 and 38 define an arc. When the ends of prongs 36 and 38 have finally fully displaced the snap ring from the shaft, the will define a substantially arc-like shape so that tool 34 can then be pushed onto the snap ring groove and sit in the snap ring groove.

FIGS. 4 and 5 illustrate how the tool 34 of this invention may be used to remove a snap ring. Ends 46 and 48 of prongs 36 and 38 are placed within the snap ring groove (not shown) in such a manner that end 46 is substantially complementary to end 39 of the snap ring and end 48 is substantially complementary to end 41 of the snap ring see FIG. 4). A force is then applied in the direction of arrow 50 on the snap ring; thus, e.g., such force may be applied by hitting tool 34 with a hammer. As is illustrated in FIG. 5, as such force is applied, prongs 36 and 38 separate further from each other, ends 46 and 48 are guided by the snap ring groove and also separate further from each other, and the snap ring 32 is dislodged from the snap ring groove.

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

I claim:

1. An articulated, self-aligning tool for removing radial retaining rings from grooved surfaces, said tool comprising:

(a) two resilient, integral prongs adapted to be moved from each other by the application of force, said prongs being substantially separated from each other by an orifice and a slot appearing therebetween, said slot communicating with said orifice, wherein:

1. each of said prongs is comprised of an inner edge, an outer edge, and a pointed end forming an acute angle with said inner edge and extending outwardly from said inner edge; and (b) means for maintaining said prongs in parallel, in-line relation to each other.

2. The tool as recited in claim 1, wherein said integral prongs consist essentially of tempered alloy material.

3. The tool as recited in claim 2, wherein said integral prongs consist essentially of spring-tempered alloy material.

4. The tool as recited in claim 3, wherein said alloy material is steel.

5. The tool as recited in claim 3, wherein said alloy material is bronze.

6. The tool is recited in claim 3, wherein said orifice has a substantially circular cross-section.

* * * * *